(12) United States Patent
Poon

(10) Patent No.: US 6,732,659 B2
(45) Date of Patent: May 11, 2004

(54) HANGING SHELF SYSTEM (76) Inventor: Enoch M. Poon, 16405 Brieva De Avila, Tampa, FL (US) 33613

( * ) Notice: Subject to any disclaimer, the term of this patent is extended or adjusted under 35 U.S.C. 154(b) by 0 days.

(21) Appl. No.: 10/237,308

(22) Filed: Sep. 9, 2002

(65) Prior Publication Data
US 2004/0045484 A1 Mar. 11, 2004

(51) Int. Cl.[7] ................................. A47B 23/00
(52) U.S. Cl. ........................... 108/42; 211/113
(58) Field of Search .............. 108/42, 180, 193; 211/113, 186, 117, 118, 119

(56) References Cited

U.S. PATENT DOCUMENTS

| | | | | |
|---|---|---|---|---|
| 1,540,024 A | * | 6/1925 | Larsen |
| 1,847,066 A | * | 3/1932 | Berg |
| 1,914,967 A | * | 6/1933 | Bebb |
| 2,244,887 A | * | 6/1941 | Manley |
| 2,440,192 A | * | 4/1948 | Cowan |
| 2,533,333 A | * | 12/1950 | Kitson |
| 2,639,819 A | * | 5/1953 | Marks |
| 3,130,838 A | * | 4/1964 | Holka et al. |
| 3,669,276 A | * | 6/1972 | Woods |
| 3,904,258 A | * | 9/1975 | Faulkenberry |
| 3,938,666 A | * | 2/1976 | Castleberyy |
| 4,108,084 A | * | 8/1978 | Fink |
| 4,329,789 A | * | 5/1982 | Erickson |
| 4,523,526 A | * | 6/1985 | O'Neil |
| 4,537,451 A | * | 8/1985 | Bredderman et al. |
| 4,688,671 A | * | 8/1987 | Felsenthal et al. |
| 5,158,186 A | * | 10/1992 | Krut |
| 5,601,016 A | * | 2/1997 | Witte |
| 5,795,041 A | * | 8/1998 | Weaver |
| 6,354,232 B1 | * | 3/2002 | Hulke |
| 6,401,947 B1 | * | 6/2002 | Hu et al. |

FOREIGN PATENT DOCUMENTS

FR 2635794 * 4/1988

* cited by examiner

*Primary Examiner*—Jose V. Chen (57) ABSTRACT

The hanging shelf system is a device suitable for hanging in closets to provide shelf and bin storage. The hanging shelf system comprises at least one shelf unit. A shelf unit comprises a top panel, a bottom panel and a longitudinally extending side panel having at least one longitudinal opening for access. A plurality of fasteners are used to adjustably attach at least one shelf panel and at least one front panel to the side panel. The fasteners comprise double buttons with button holes, pin with clasp, snaps, hook and eyelet and cloth hook and loop fasteners. Structure for attaching the shelf system to a support is connected to the top panel.

15 Claims, 6 Drawing Sheets

HANGING SHELF SYSTEM

BACKGROUND OF THE INVENTION

1. Field of the Invention

The present invention relates to a hanging shelf storage system. In particular, the invention relates to a device, suitable for hanging in closets, that provides shelf and bin storage.

2. Description of the Prior Art

Hanging garment bags are a well-known devices for storing clothes that have been hung on hangers. Frequently clothing is also stored in the bottom of such containers.

U.S. Pat. No. 2,440,192, that was issued to I. M. Cowan, illustrates a version of the collapsible hanging garment bag in which shelves have been attached for storage of clothing articles not on hangers. These shelves are adjustably attached to flexible tapes by a clasp that is crimped about the tape. The shelves are constructed from rigid material such as plywood or heavy cardboard, which adds weight to the device.

The prior art discloses a number of other collapsible bags having fixed shelves some of which are used to store shoes and other similar sized articles. Collapsible hanging shelves and storage cabinets have been used for the temporary storage of food and other equipment at campsites.

Notwithstanding the existence of such prior art storage containers, it remains clear that there is a need for storage containers that are light in weight and have a greater flexibility, enabling the user to convert the shelving into bins, constructing a combination of shelving and bins, and/or expanding the storage by joining similar units together into a storage system.

SUMMARY OF THE INVENTION

The present invention relates to a hanging shelf system that comprises at least one shelf unit. The shelf unit comprises a top panel and a bottom panel, each having a peripheral edge. At least one longitudinally extending side panel, having a first end, a second end and a pair of opposing longitudinal edges, extends between the top panel and the bottom panel. The first end of the side panel is attached to the peripheral edge of the top panel and the second end is attached to the peripheral edge of the bottom panel so that the longitudinal edges of the side panel are spaced apart from one another.

A plurality of shelf panels, each having a peripheral edge, lie adjacent the interior surface of the side panel. At least one front panel is attachable to the opposing longitudinal edges of the side panel partially closing the opening between the longitudinal edges of the side panel.

A plurality of fasteners are used to adjustably attached the shelf panels and the front panel to the side panel. A means for attaching the shelf system to a support is connected to the top panel.

The invention accordingly comprises an article of manufacture possessing the features, properties, and the relation to elements which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which.

Similar reference characters refer to similar parts throughout the several views of the drawings.

DESCRIPTION OF A PREFERRED EMBODIMENT

A preferred embodiment for the hanging shelf system of this invention is illustrated in the drawing FIGS. 1–4 and 10 in which the apparatus is generally indicated as 10. Referring first to the view of FIG. 1, the hanging shelf system 10 comprises at least one shelf unit shown generally as 12, and in FIG. 10 the hanging shelf system 10 comprises two shelf units.

Figure 1:
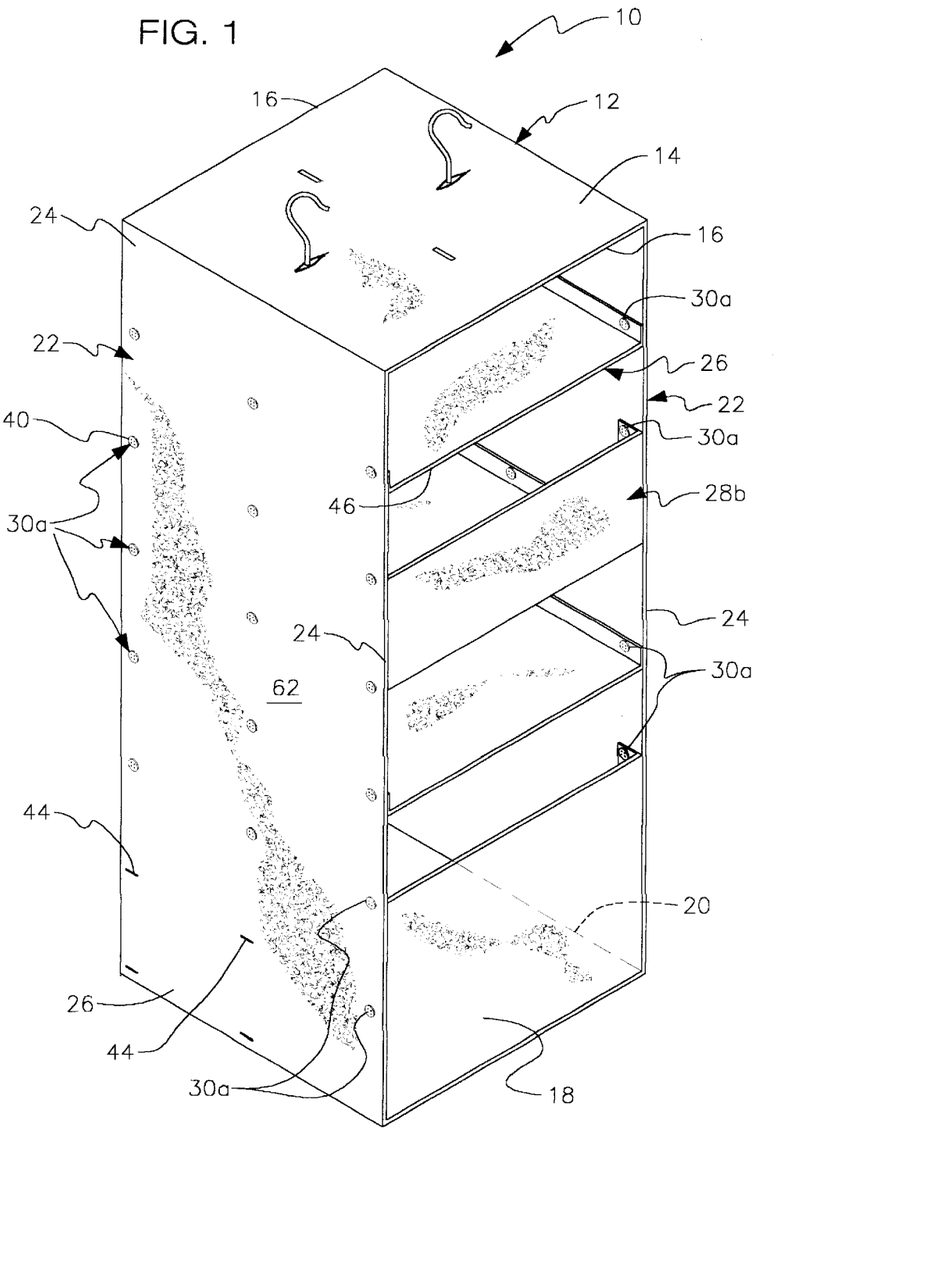
FIG. 1 is an isometric view of a hanging shelf system of this invention comprising a single shelf unit.

Referring first to FIG. 1, it can be seen that the shelf unit 12 comprises top panel 14, that has a peripheral edge 16, a bottom panel 18, that has a peripheral edge 20, and at least one side panel 22. The side panel 22 extends longitudinally between the top panel 14 and the bottom panel 18. The first end 24 of the side panel 22 is attached to the peripheral edge 16 of the top panel 14 and the second end 26 of the side panel 22 is attached to the peripheral edge 20 of the bottom panel 18. The top panel 14 and bottom panel 18 each have a plurality of sides, conveniently four sides in the illustrated preferred embodiment; however, in other preferred embodiments there may be any convenient number of sides, such that a single side comprises a circular configuration, two sides comprise a portion of a circle and a chord, three sides form a triangular configuration, and so on. A four sided configuration is considered to be the most convenient as clothes and other articles to be stored therein are normally formed in generally rectangular shapes. In order to have an open side, the side panel 22 extends around and is attached to the peripheral edge 16 of three sides of the top panel and to the peripheral edge 20 of three corresponding sides of the bottom panel, therefor the longitudinal edges 24 of the side panel 22 are spaced apart from one another. Certainly, in other configurations, there may be two or more side panels 22 whose longitudinal edges are spaced apart from one another and would therefore leave additional openings on other sides for access to the materials to be stored in the hanging shelf unit 10.

Figure 2:
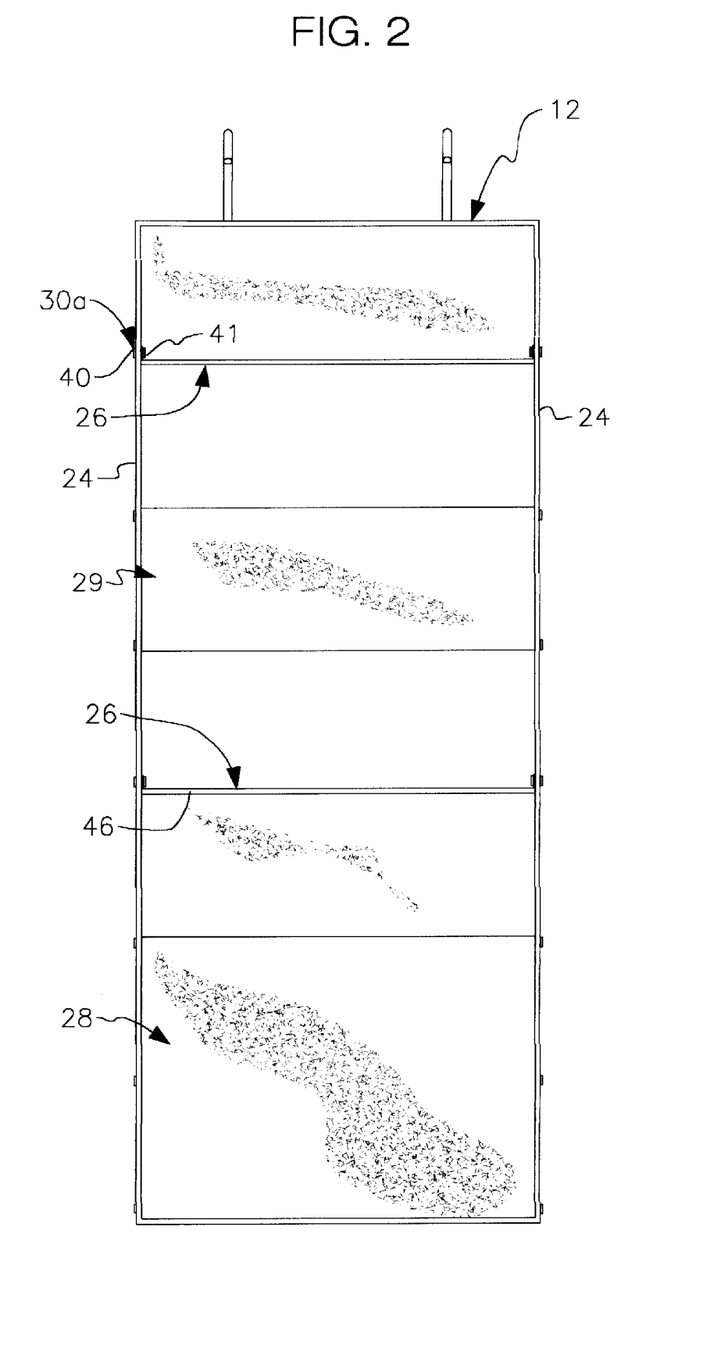
FIG. 2 is a front elevational view of the invention illustrated in FIG. 1.
Figure 4:
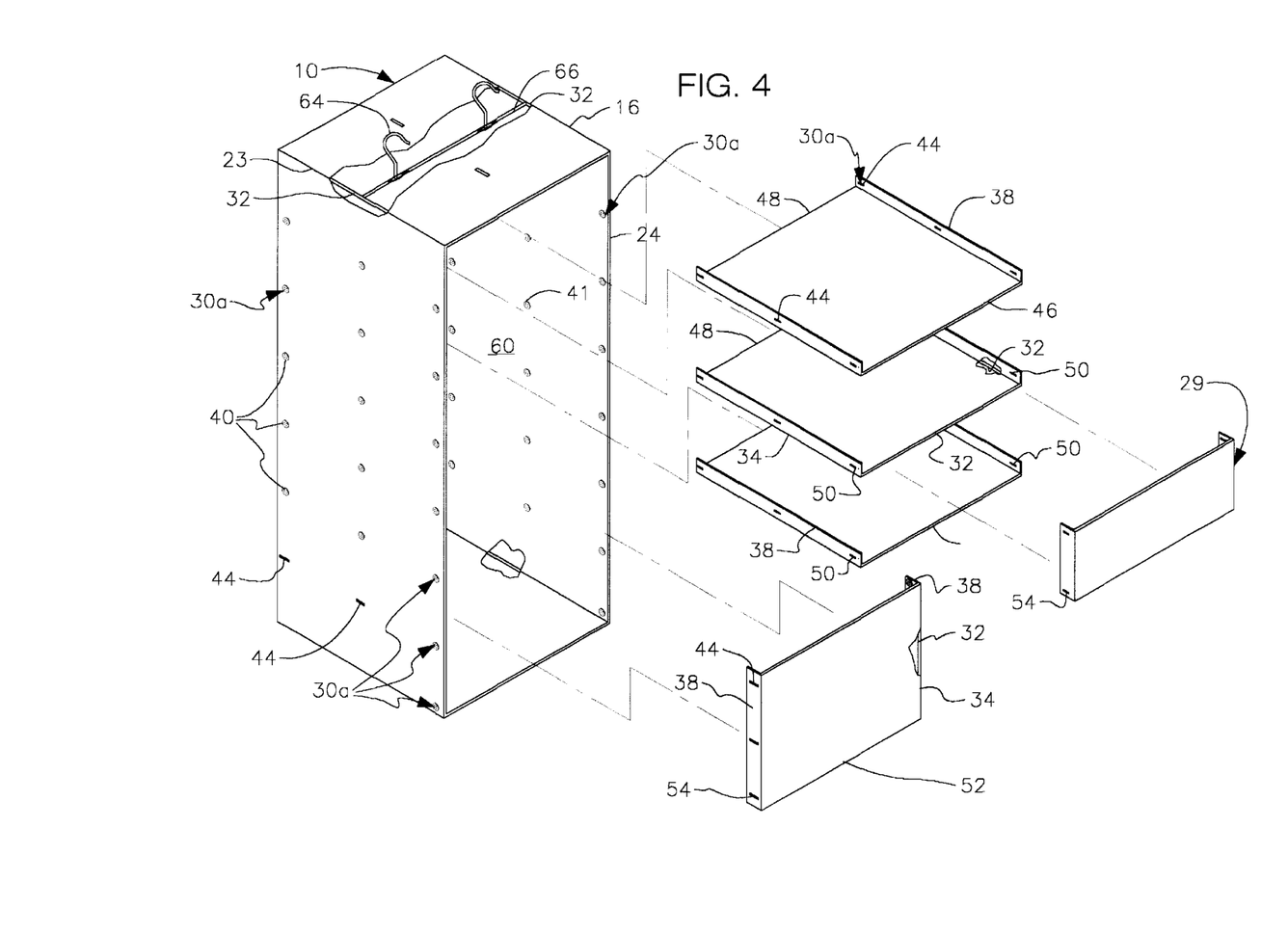
FIG. 4 is an exploded isometric view illustrating the various shelves and front panels that comprise the invention of FIG. 1

As seen in FIGS. 1, 2, and 4, at least one shelf panel 26 and at least one front panel 28 are attached to the side panel 22 by a plurality of fasteners 30a–e. The shelf panel 26 and the front panel 28 are interchangeable with one another and are therefore have the same structure, but are attached to the side panel 22 in a different configuration. The shelf panel 26 provides support for storing things generally horizontally. The front panel 28 closes a portion of the front opening, defined as the opening between the longitudinal edges of the side panel 22, adjacent a shelf panel to create a bin for storage of loose items or unfolded items like dirty clothes. As seen in FIG. 1 and in FIG. 4, the front panel 28 may also be constructed so that it is a generally half sized front panel 29. While not illustrated, this front panel 29 may also comprise a half shelf as the front panels and the shelf panels are interchangeable. As illustrated in the drawing figures there are preferably a plurality of shelf panels and one or more front panels to subdivide the shelf unit 12 into a plurality of storage areas.

Each shelf panel 26 and front panel 28 is comprised of a wire frame 32 that defines the peripheral edge 34 of each shelf panel 26 and front panel 28. A flexible material 36 is stretched across the wireframe 32 and is attached thereto by stitching or other well-known means, including but not limited to cement and stapling. In other preferred embodiments, the shelf may be constructed from rigid materials that would also be suitable. At least one flange 38 is attached to the peripheral edge 34 of the shelf panels 26 and the front panels 28. The flanges 38 are used to attach the shelf panels and the front panels to the side panel by the fasteners 30a –e. In a preferred embodiment, as illustrated, a flange 38 is attached to opposing sides of the rectangular shelf panels and front panels. In other embodiments, a single flange may extend about three sides of the shelf panels 26 and front panels 28 and 29, or there may be a plurality of flanges located at the points of attachment of the shelf and front panels to the side panel.

Figure 5:
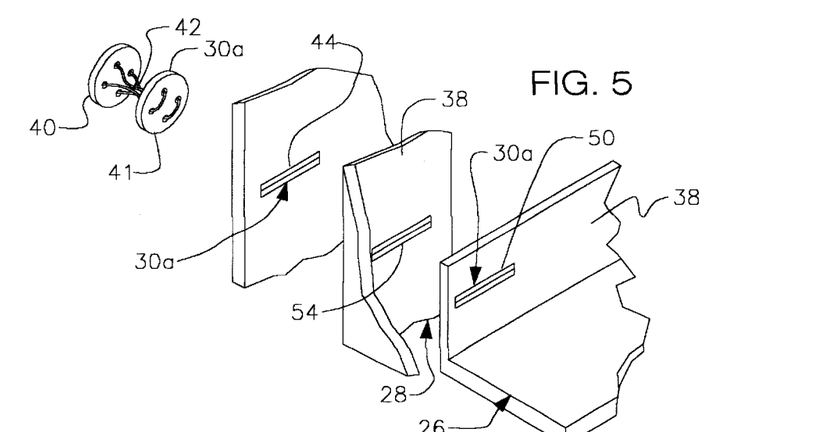
FIG. 5 is a detailed view of a first embodiment of a fastener, namely a double button, used to attach the shelf panels and the front panel to the side panel, most of the front panel being broken away for ease of illustration.

In a preferred embodiment, the fasteners comprise double button fasteners 30a constructed from a pair of buttons, a first button 40 and a second button 41, that are joined to one another by a connector 42 as seen in FIG. 5 and a plurality of button holes 44 formed in the side panel 22, the shelf panel, 26 and the front panels 28 and 29. The connector 42 may comprise a plurality of threads looped through the buttonholes and tied off. In other embodiments a connector 42 may comprise a wire that is attached to one of the buttons at each of the opposing ends of the wire. For those skilled in the art, other methods for attaching the buttons to one another will be easily discernible. In a preferred embodiment, the connector 42 is comprised of a thread so that the double buttons 30a are easily maneuverable.

In a preferred embodiment, a plurality of button holes 44 are formed through the side panel 22, beginning proximal to the longitudinal edges 24 of the side panel 22. The placement of the button holes 44 will generally comprise a pattern, with the buttonholes spaced in horizontal rows across the side panel 22, so that, as desired, the shelf panels may be attached to the side panel 22 at any point in which button holes in the shelf panel match button holes in the side panel 22. In a preferred embodiment, the pattern comprises a matrix, with a plurality of rows beginning proximal the top panel and the last row being proximal the bottom panel. Each row is comprised of at least three buttonholes each to provide adequate support for a full shelf. Obviously those skilled in the art may provide additional buttonholes or less in each row and may provide as many rows as reasonable for the projected use of the hanging shelf system and the particular longitudinal length of the side panel 22. To enable the shelf panels to be used as front panels with the minimum number of buttonholes, the vertical spacing of the rows must match the horizontal spacing of the button holes, so that the spacing between the buttonholes in the matrix is equal in the horizontal and vertical directions.

When the shelf panel flange 38 comprises a continuous flange about at least three sides of the shelf panel, three button holes spaced about the shelf panel 26 will be adequate to hold the shelf in place. In a preferred embodiment, when the shelf panels 26 and the front panel 28 are rectangular and there is a flange on opposing sides of the shelf and front panels, at least three button holes 44 are formed through each flange 38, with a buttonhole adjacent to the longitudinal edges 24 of the side panel 22. For example, in FIGS. 1 and 2, and most clearly in FIG. 4, each shelf panel 26 and each front panel 28 have three buttonholes formed in each of the two flanges 38, the buttonholes being spaced to match the buttonholes on the side panel 22, both horizontally and vertically.

Figure 3:
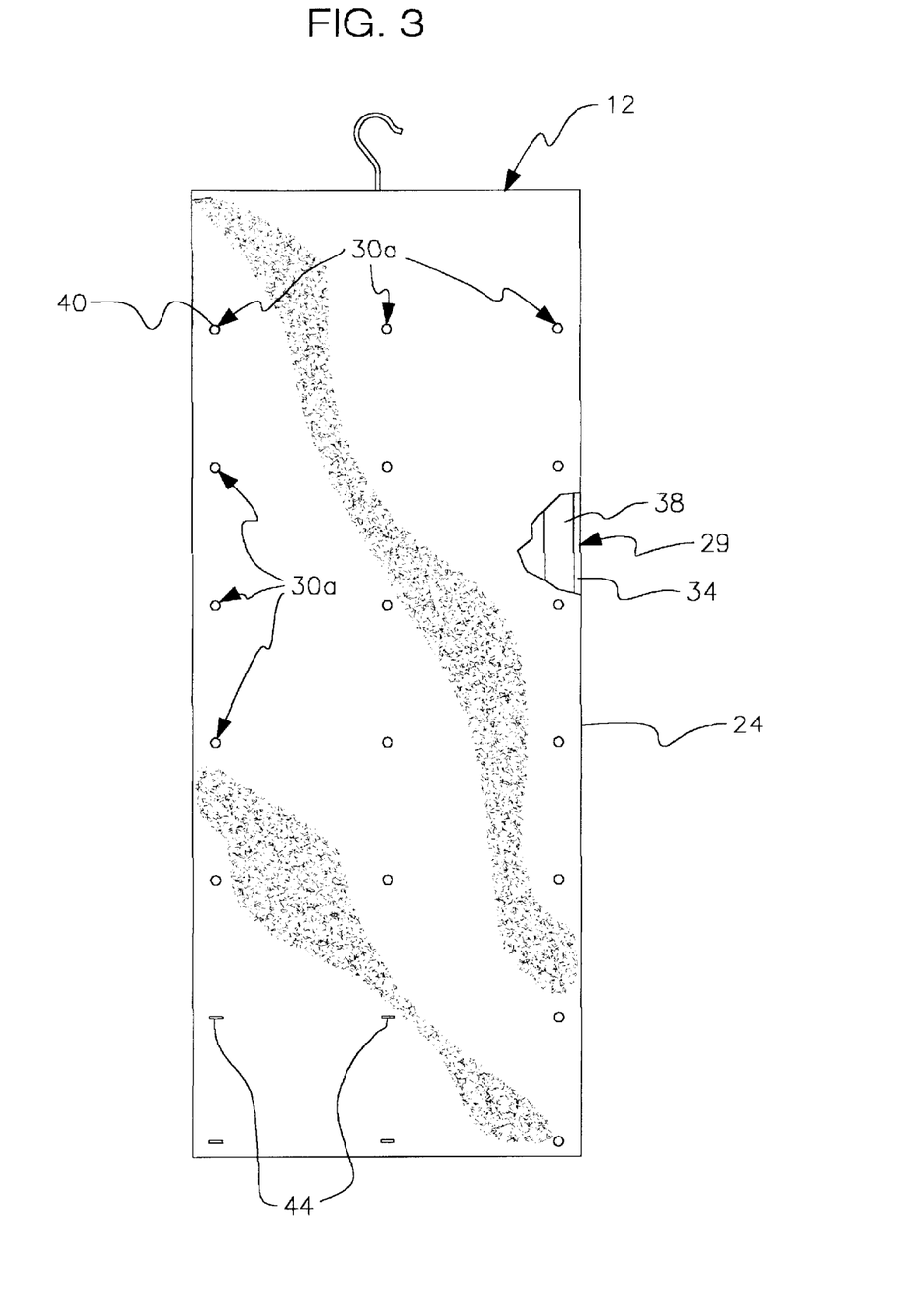
FIG. 3 is a left side elevational view of the invention of FIG. 1

Shelf panels 26 are attached to said side panel 22 by aligning the button holes 44 in the shelf panel with selected portion of the button holes in the side panel 22. The first button 40 of the double button fastener 30a is passed through each of the three buttonholes in each flange 38. The shelf panel 26 is then aligned with the pattern of buttonholes in the side panel 22 so that the buttonholes in the shelf panel coincide with the buttonholes in the side panel, when the shelf is located in a preferred position. Normally a preferred position will be as shown in FIGS. 1–3, with the shelf panels being generally horizontal and the front edge 46 of the shelf panel being generally flush with the longitudinal edges 24 of the side panel 22. The shelf panels will be sized so that the rear edge 48 is adjacent to the side panel 22, thereby keeping stored articles from falling through.

As best seen in FIG. 4, Front panels 28 and 29 may be attached anywhere along the longitudinal edges 24 of the side panels 22; however the front panels 28 and 29 are normally attached adjacent to a shelf panel 26 in order to create a bin for storage of loose or soiled items. Each shelf panel flange 38 has a pair of buttonholes, which are defined as front buttonholes 50, adjacent to the front edge 46 of the shelf panel. Each front panel flange 38 has a pair of buttonholes, defined as lower buttonholes 54, adjacent to the lower edge 52 of the front panel. Therefore, the front panels 28 and 29 are attached adjacent to a shelf panel by inserting the first button 40 of the double button fastener 30a through one of the front buttonholes 50 of a shelf panel 26, then through a corresponding lower buttonhole 54 of a front panel 28 and then through the selected button hole 44 in the side panel 22. A second double button fastener 30a is inserted through the other front buttonhole 50 of the shelf panel, through the other lower buttonhole 54 of the front panel and then through the button hole 44 on the opposite side of the side panel 22. Other double button fasteners 30a are then inserted through the remaining buttonholes in the front panel and through corresponding buttonholes 44 in the side panel 22. When a half sized front panel is constructed, it is preferable that it be sufficiently larger than exactly one-half of a front panel so the buttonholes in the half-sized panel continue to match the buttonholes in the side panel 22, in order to avoid having to place an additional buttonhole along the longitudinal edges 24 of the side panel 22. In this manner, shelf panels and front panels are attached to the side panel 22 as desired.

Figure 6:
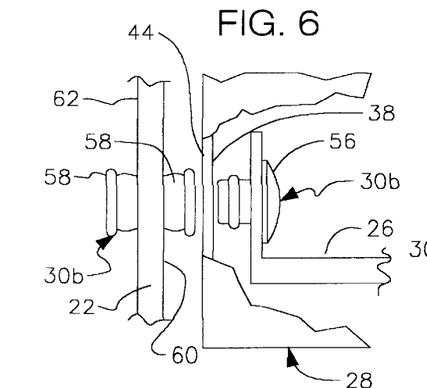
FIG. 6 is a detailed view of a second embodiment of a fastener, namely a snap, to attach the shelf panels and the front panel to the side panel, most of the front panel being broken away for ease of illustration.
Figure 7:
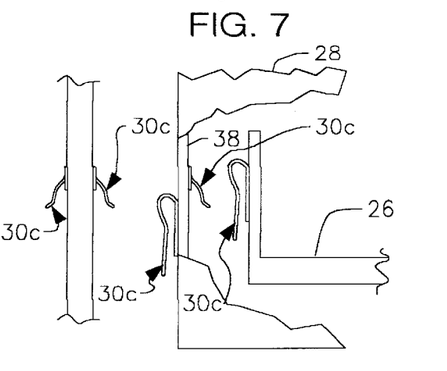
FIG. 7 is a detailed view of a third embodiment of a fastener, namely a hook and eyelet, to attach the shelf panels and the front panel to the side panel, most of the front panel being broken away for ease of illustration.
Figure 8:
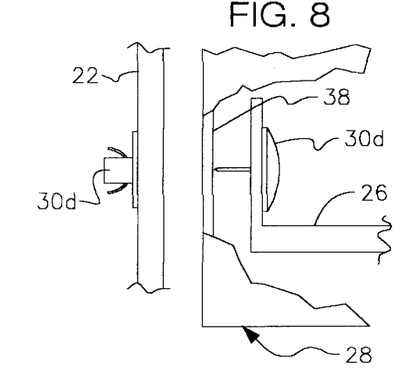
FIG. 8 is a detailed view of a fourth embodiment of a faster, namely a pin and clasp to attach the shelf panels and the front panel to the side panel, most of the front panel being broken away for ease of illustration.
Figure 9:
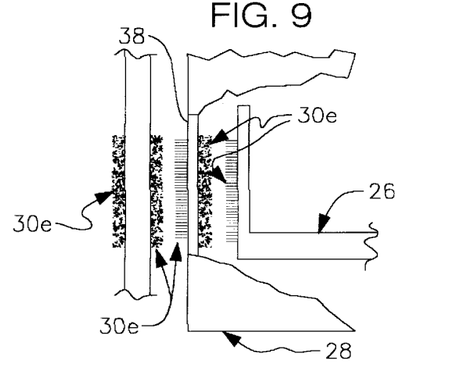
FIG. 9 is a detailed view of a fifth embodiment of a fastener, namely a cloth hook and loop fastener, to attach the shelf panels and the front panel to the side panel, most of the front panel being broken away for ease of illustration.

As seen in FIGS. 6–9, other types of fasteners may be used to attached the shelf panels and front panels to the side panel of the hanging shelf system 10. FIG. 6 discloses a snap fastener 30b, FIG. 7 discloses a hook with eyelet fastener 30c, FIG. 8 discloses a pin with clasp fastener 30d and FIG. 9 discloses a hook and loop fastener 30e. Each of these fasteners 30b–e comprise a first part and a second part. For example, the snap 30b has a first part 56 and a second part 58. One of the parts, conveniently the second part 58 is attached to the interior surface 60 of the side panel 22 in a pattern similar to that of the buttonholes 44 used as a part of the fastener system 30a. In this case, another second part 58 of the fastener 30b is applied to the exterior surface 62 of the side panel 22. Obviously to maintain the same pattern as used with the buttonholes 44 the second fasteners must be attached back-to-back. In this case, it is not required that they be applied back-to-back and they may be applied in any other pattern desired. Instead of buttonholes in the shelf panels, a first part 56 of the fastener 30b is attached in the same location in which the buttonholes were formed. Now the shelf panels may be attached to the side panel using the snaps 30b. When front panels 28 are attached, the point at which the lower buttonholes 54 would be located using the fasteners 30a, would require a second part 58 of the fastener 30b to be attached to the interior of the flange and a first part to be attached to the exterior of the flange. In the alternative, a buttonhole 44 may be used and the first part 56 of the fastener 30b will be inserted through the buttonhole and attached to the second part 58, as shown in FIG. 8. The remaining corresponding first and second parts of the fasteners 30b are attached to one another to fully attached the front panel to the longitudinal edges 24 of the side panel 22.

The fasteners 30c and 30e are used in the same manner as the fastener 30b with the exception that a buttonhole would not be effective for attachment of the lower portion of the front panels between the adjacent shelf panel and side panel. The fasteners 30d have two parts, however neither of these parts are attached to the side panel, shelf panels or front panels. This provides a great deal more flexibility in that the shelf panels may be attached anywhere along the side panels. This increases the flexibility of the fastener 30d; however, it may increase the difficulty in attaching the shelf panels so that they are level. Therefore in a preferred embodiment, the interior surface 60 of the side panel 22 may be marked with horizontal and vertical lines to aid in the attachment of the shelf panels.

Figure 10:
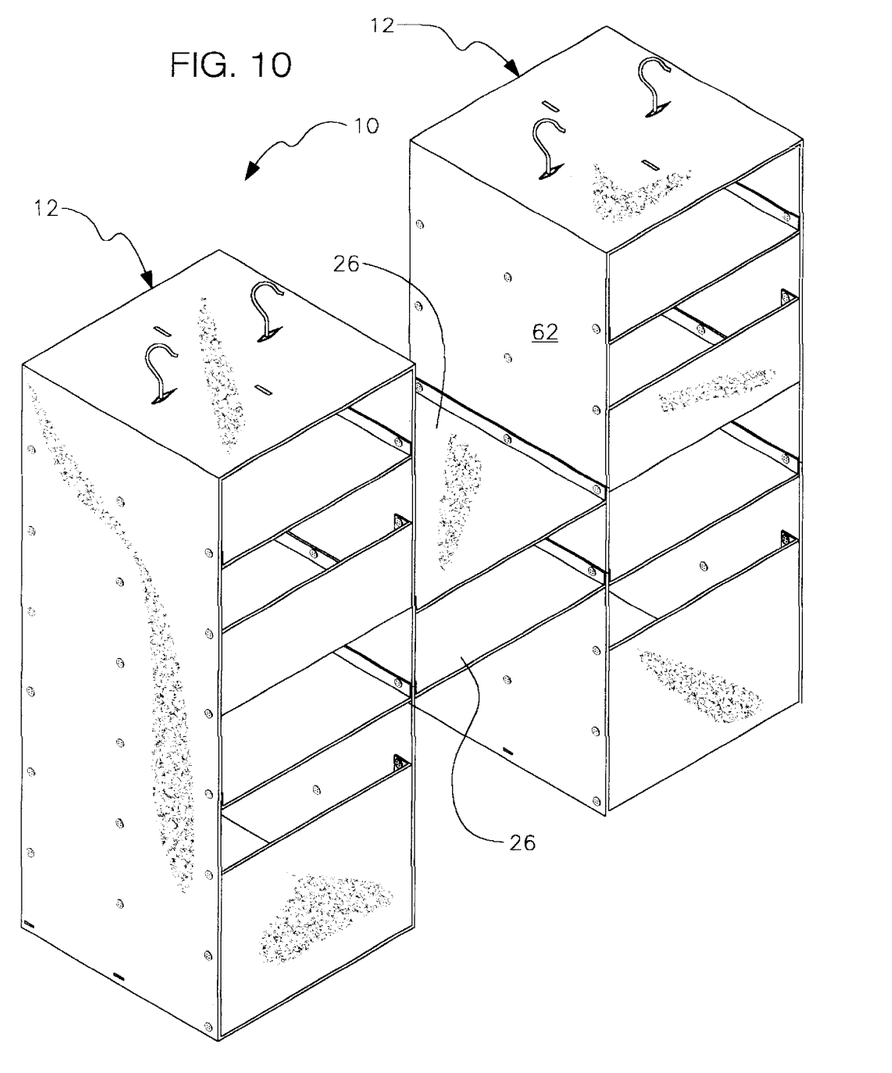
FIG. 10 is an isometric view of a hanging shelf system of this invention comprising two shelf units that are joined together by a pair of shelves.

As seen in FIG. 10, the hanging shelf system comprises two shelf units 12 that are attached to one another by shelf panels 26 being attached to the fasteners located on the exterior surface 62 of each shelf unit 12. When using the double button fasteners 30a, the buttons are already projecting to the exterior surface 62 and are readily available for attachment of the shelf panels 26. FIG. 10 illustrates one configuration for the hanging shelf system 10 using two shelf units; however, any number of configurations can be created by the user, including the attachment of front panels 28 or 29.

A means for attaching the hanging shelf system 10 to a support is attached to the top panel 14, as seen in FIG. 4. One well-known method is to attach hooks 60 to a crosswire 66 that extends between portions of the wireframe 32 in the top panel 14. The hooks 60 may be used to attach the hanging shelf system 10 to a closet hangar bar. Other means for attaching the hanging shelf system 10 will be readily apparent to those skilled in the art.

While the foregoing describes a particularly preferred embodiment of the structure of the present invention, it is to be understood that numerous variations and modifications of the structure will occur to those skilled in the art. Accordingly, the foregoing description is to be considered illustrative only of the principles of this invention and is not to be considered limitative thereof, the scope of the invention being determined solely by the claims appended hereto.

What is claimed is:

1. A hanging shelf system comprising:
   at least one shelf unit, said shelf unit comprising;
      a top panel having a peripheral edge;
      a bottom panel having a peripheral edge;
      at least one longitudinally extending side panel, having a pair of longitudinal edges, an exterior surface, an interior surface, a first end and a second end, said first end of said side panel being attached proximal to said peripheral edge of said top panel and said second end being attached proximal to said peripheral edge of said bottom panel, such that said longitudinal edges of said side panel are spaced apart from one another;
      at least one shelf panel having a peripheral edge, said shelf panel being adjustably attachable to said interior surface of said side panel such that said shelf panel extends between portions of said at least one side panel;
      at least one front panel, said front panel being attachable to said side panel proximal to said longitudinal edges of said side panel such that it is attached proximal said shelf panel;
      a plurality of fasteners, said fasteners adjustably attaching said shelf panel and said front panel to said side panel; and
      means for attaching said top panel to a support.

2. A hanging shelf system as in claim 1, wherein said shelf panel comprises at least one flange extending about and outwardly from said periphery of said shelf panel and said front panel comprises at least one flange extending about and outwardly from said periphery of said front panel.

3. A hanging shelf system as in claim 2, wherein said fasteners attach said flange of said shelf panel to said interior surface of said side panel and said fasteners attaching said flange of said front panel proximal to said longitudinal edges of said side panel.

4. A hanging shelf system as in claim 3, wherein each said fastener comprises a double button and corresponding button holes in said side panel, said shelf panel and in said front panel, each said double button comprising a first button and a second button attached to one another and spaced apart from one another by a connector, and button holes formed in a pattern in said side panel, at least three button holes formed in said flange of said shelf panel, and at least four button holes formed in said flange of said front panel, such that when said button holes in said flange of said shelf panel are aligned with a selected portion of said pattern of button holes in said side panel at least three pairs of aligned button holes are created, each pair of aligned button holes receiving said first button of said double button therethrough such that said first button of said double button is adjacent said exterior surface of said side panel such that said double button fasteners attach said flange of said shelf panel to said side panel, and in the same manner, said flange of said front panel is attached to said side panel proximal said longitudinal edges of said side panel by said double buttons.

5. A hanging shelf system as in claim 4 wherein said double buttons may be passed through a series of aligned button holes, including a button hole in said shelf panel, a button hole in said front panel and a button hole in said side panel.

6. A hanging shelf system as in claim 4, wherein said flange of said shelf panel has a pair of front portions, each front portion of said flange of said shelf having one of said at least three button holes therethrough defining front button holes and said flange of said front panel has a pair of lower portions, each lower portion of said flange of said front panel having one of said at least four button holes therethrough defining lower button holes, each lower button hole being aligned with a corresponding front button hole, said aligned buttonholes receiving one of said double buttons therein.

7. A hanging shelf system as in claim 6, wherein each said fastener comprises a snap having two parts.

8. A hanging shelf system as in claim 6, wherein each said fastener comprises a cloth hook and loop having two parts.

9. A hanging shelf system as in claim 6, wherein each said fastener comprises a hook and eye having two parts.

10. A hanging shelf system as in claim 6, wherein each said fastener comprises a pin and clip having two parts.

11. A hanging shelf system as in claim 2, wherein said fasteners comprise a first part and a second part, said first part being formed in a pattern on said interior surface of said side panel and in a pattern on said exterior surface of said side panel, at least three of said second parts being attached to said flange of said shelf panel, said flange of said front panel having a bottom surface and a top surface and at least four first parts being attached to said bottom surface and at least four second parts being attached to said top surface such that said shelf panel and said front panel are attachable to said side panel.

12. A hanging shelf system as in claim 1, wherein each said shelf panel comprises a wire frame defining said peripheral edge of said shelf panel and a flexible material being stretched across said wire frame and attached thereto.

13. A hanging shelf system as in claim 1, wherein said front panel comprises a wire frame, said wire frame defining a peripheral edge of said front panel, and a flexible material being stretched across said wire frame so that said flexible material is attached to the wire frame of said front panel.

14. A hanging shelf system as in claim 1, wherein at least one of said shelf panels and said front panel is interchangeable.

15. A hanging shelf system as in claim 1, wherein said at least one shelf unit comprises a first shelf unit and a second shelf unit, said first unit being attached to said second unit by at least one shelf being attached to said side panel of said first shelf unit and being attached to said side panel of said second shelf unit.

* * * * *